(12) United States Patent
Green

(10) Patent No.: US 7,244,355 B2
(45) Date of Patent: Jul. 17, 2007

(54) ORGANIC AND ANIMAL WASTE EFFLUENT TREATMENT

(76) Inventor: Troy Green, 2810 W. Clearwater, Suite 201, Kennewick, WA (US) 99336

( * ) Notice: Subject to any disclaimer, the term of this patent is extended or adjusted under 35 U.S.C. 154(b) by 56 days.

(21) Appl. No.: 11/099,312

(22) Filed: Apr. 4, 2005

(65) Prior Publication Data

US 2006/0219614 A1    Oct. 5, 2006

(51) Int. Cl.
   *C02F 3/06*      (2006.01)
(52) U.S. Cl. .................... 210/150; 210/188; 210/615
(58) Field of Classification Search ............... 210/150, 210/151, 188, 604, 615
See application file for complete search history.

(56) References Cited

U.S. PATENT DOCUMENTS

| | | | | |
|---|---|---|---|---|
| 2,590,964 | A | * | 4/1952 | Orin ........................... 210/615 |
| 3,329,271 | A | * | 7/1967 | Ward et al. ................. 210/150 |
| 3,402,103 | A | | 9/1968 | Amberg |
| 3,928,701 | A | | 12/1975 | Roehner |
| 4,599,167 | A | * | 7/1986 | Benjes et al. ............... 210/150 |
| 4,632,758 | A | * | 12/1986 | Whittle ....................... 210/151 |
| 4,824,287 | A | | 4/1989 | Tracy |
| 4,997,568 | A | * | 3/1991 | Vandervelde et al. ....... 210/150 |
| 5,277,814 | A | * | 1/1994 | Winter et al. ............... 210/604 |
| 6,428,691 | B1 | | 8/2002 | Wofford |
| 6,592,761 | B2 | | 7/2003 | Wofford |
| 6,811,701 | B2 | | 11/2004 | Wilkie |
| 7,081,203 | B2 | * | 7/2006 | Helm ......................... 210/150 |

* cited by examiner

*Primary Examiner*—Christopher Upton
(74) *Attorney, Agent, or Firm*—Floyd E. Ivey; Liebler Ivey Connor Berry & St. Hilaire

(57) ABSTRACT

An organic and animal waste treatment apparatus (1) comprising a container (10) with substantially torus shaped bio-film media (200) provided primarily by tires (72) formed in multiple layers. A layer proximal the bottom (20) is at least one first layer of bio-film media (70) or at least one first layers of tires (72) having a first layer top (80) and forming a Loose Density Zone (300). A next layer on top of the first layer top (80) is at least one second layer of bio-film media (90) or at least one second layer of tires (92) having a second layer top (100) and forming a Transition Density Zone (320). A next layer on top of the second layer top (100) is at least n subsequent layers (110) or at least n subsequent layers of tires (112) and forming a Compact Density Zone (340). The Loose Density Zone (300) covers between 20% to 40% of the bottom surface area (60). The Transition Density Zone covers between 30% to 50% of the first layer top surface area (85). The Compact Density Zone covers between 40% to 70% of the second layer top surface area (105). Organic and animal waste is received into the container (10) and is circulated with gases (140) released and contained in the container (10) by a top cover (40). Gases (140) are removed for storage or combustion via at least one top cover vent (170).

18 Claims, 3 Drawing Sheets

ORGANIC AND ANIMAL WASTE EFFLUENT TREATMENT

FIELD OF THE INVENTION

This invention relates to an apparatus for the treatment of organic, including animal, waste effluent. The invention more specifically relates to an apparatus providing a system for such treatment and for providing surfaces for bio-film for anaerobic digestion. The structure providing surfaces for bio-film are comprised of automotive tires.

BACKGROUND OF THE INVENTION

The treatment of organic and or animal wastes with digesters is known in the prior art including U.S. Pat. No. 4,824,287 to Tracy; U.S. Pat. Nos. 6,592,761 and 6,428,691 to Wofford; U.S. Pat. No. 6,811,701 to Wilkie; U.S. Pat. No. 3,402,103 to Amberg, et al; U.S. Pat. No. 3,928,701 to Roehner.

The patents referred to herein are provided herewith in an Information Disclosure Statement in accordance with 37 CFR 1.97.

SUMMARY OF THE INVENTION

The organic and animal waste treatment apparatus (1) of this invention comprises a container (10) with substantially torus shaped bio-film media (200) provided primarily by tires (72) formed in multiple layers. A layer proximal the bottom (20) is at least one first layer of bio-film media (70) or at least one first layers of tires (72) having a first layer top (80) and forming a Loose Density Zone (300). A next layer on top of the first layer top (80) is at least one second layer of bio-film media (90) or at least one second layer of tires (92) having a second layer top (100) and forming a Transition Density Zone (320). A next layer on top of the second layer top (100) is at least n subsequent layers (110) or at least n subsequent layers of tires (112), where n equals 1 to infinity, and forming a Compact Density Zone (340). The Loose Density Zone (300) covers between 20% to 40% of the bottom surface area (60). The Transition Density Zone covers between 30% to 50% of the first layer top surface area (85). The Compact Density Zone covers between 40% to 70% of the second layer top surface area (105). Organic and animal waste is received into the container (10) and is circulated with gases (140) released and contained in the container (10) by a top cover (40). Gases (140) are removed for storage or combustion via at least one top cover vent (170).

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DETAILED DESCRIPTION

Figure 1:
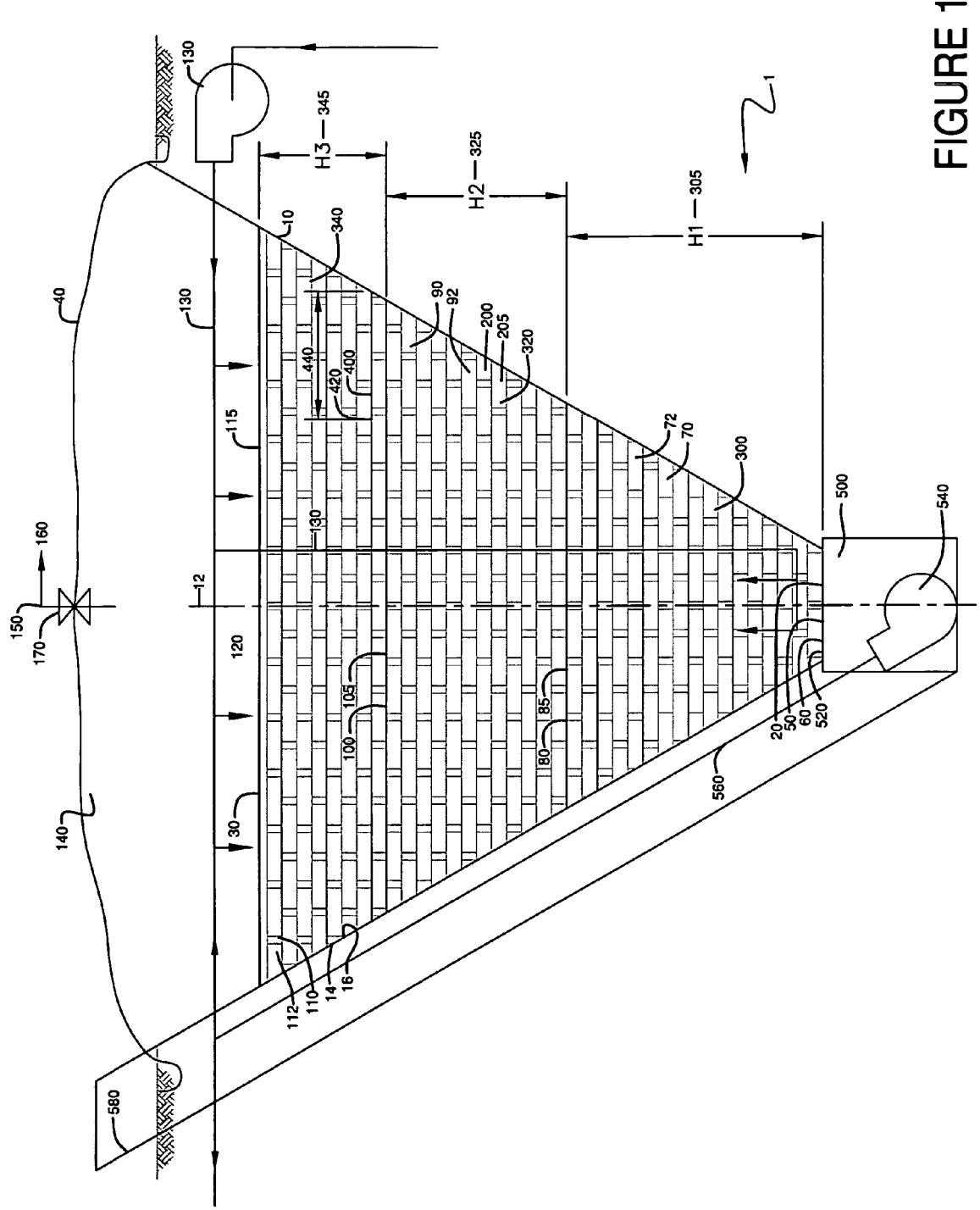
FIG. 1 illustrates the organic and animal waste treatment apparatus (1) showing a container (10) having a container center axis (12), a container inside (14) and a container inside surface (16). Seen is a bottom(20), a top (30), a top cover (40), a bottom surface (50) and a bottom surface area (60). Shown is at least one first layer of bio-film media (70) and or at least one first layers of tires (72), a first layer top (80), a first layer top surface area (85), at least one second layer of bio-film media (90) and or at least one second layer of tires (92) having a second layer top (100) and a second layer top surface area (105). Seen is at least n subsequent layers (110) and or at least n subsequent layers of tires (112). Illustrated is organic and animal waste (120), pipe and pump means (130), gases (140), gas conveyance means (150), storage or combustion means (160), at least one top cover vent (170). Seen is a Loose Density Zone (300) having a Loose Density Zone height (305), a Transition Density Zone (320) having a Transition Density Zone height (325) and a Compact Density Zone (340) having a Compact Density Zone height (345). Seen is at least one baffle (400), a baffle inner edge (420), a baffle width (440), a sump (500), a sump cover (520), sump pump means (540), pipe means (560) and a pump access tube (580). Also seen is at least one first layers of tires (72), at least one second layer of tires (92), at least one n subsequent layers of tires (112) and a tire (205). Also seen is the ground surface (590).
Figure 1A:
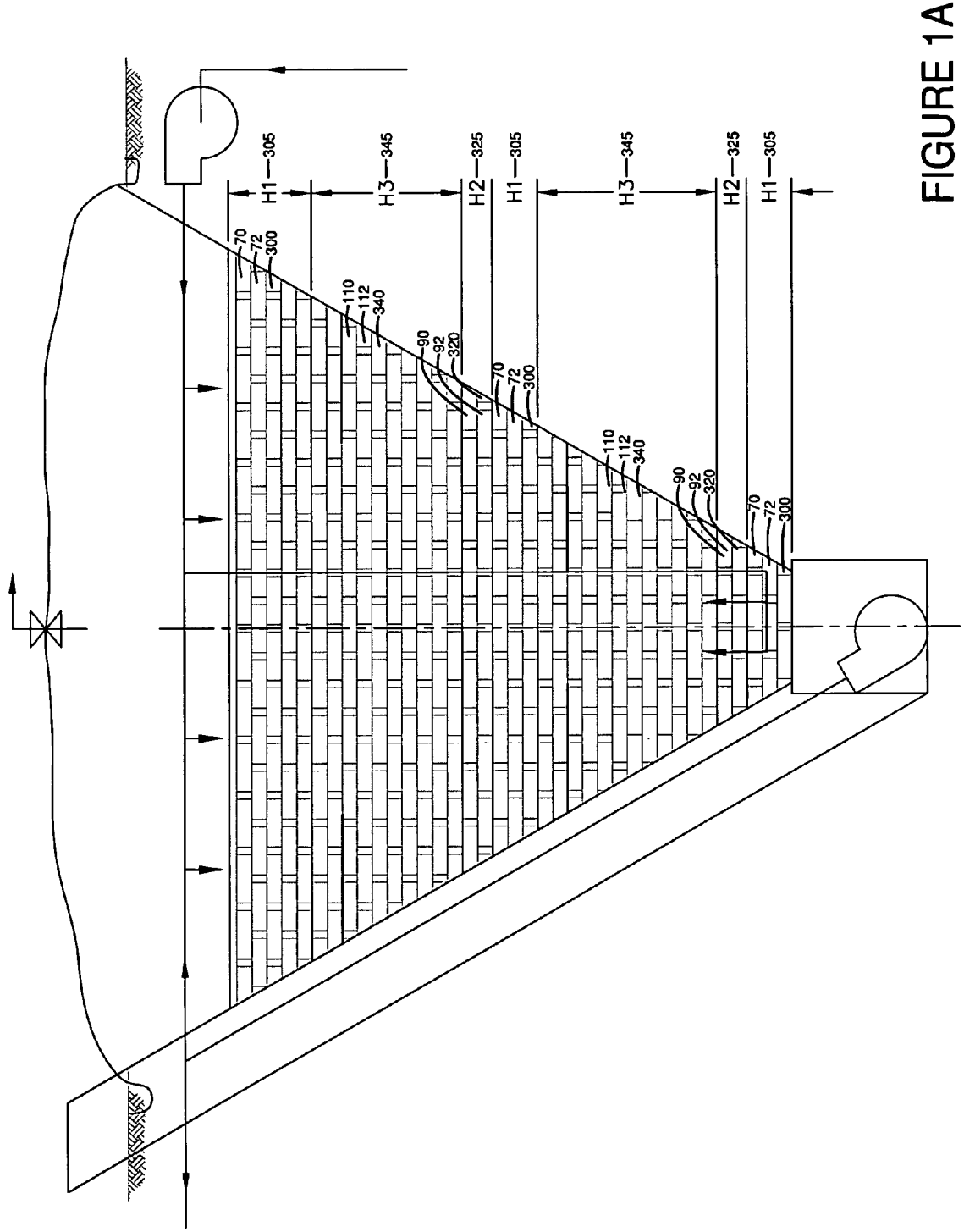
FIG. 1A illustrates alternating layers of at least one first layer of bio-film media (70) comprising a Loose Density Zone (300) with at least one second layer of bio-film media (90) comprising a Transition Density Zone (320) with at least "n" subsequent layer of tires (112) comprising a Compact Density Zone (340).
Figure 2:
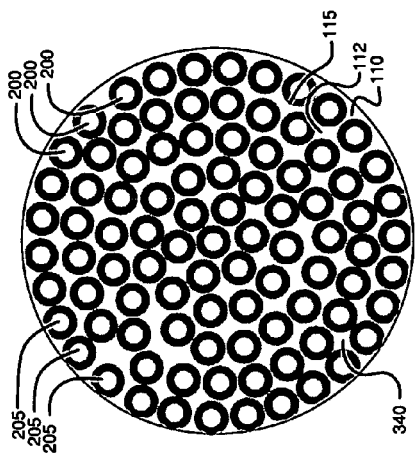
FIG. 2 illustrates at least one first layer of bio-film media (70) and or at least one first layers of tires (72) as a Loose Density Zone (300).
Figure 3:
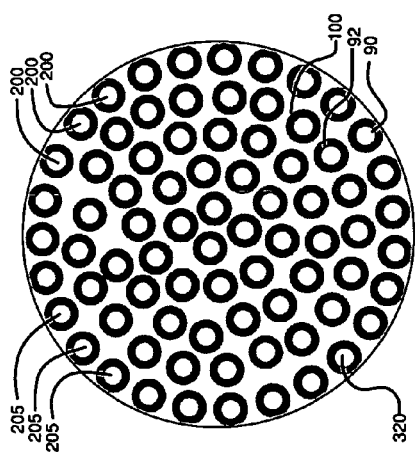
FIG. 3 illustrates at least one second layer of bio-film media (90) and or at least one second layers of tires (92) as a Transition Density Zone (320).
Figure 4:
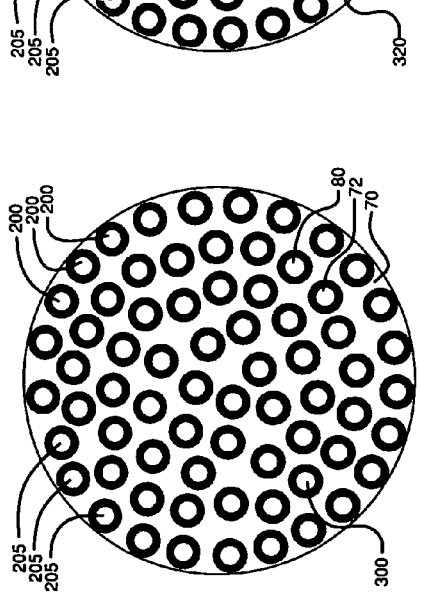
FIG. 4 illustrates at least one n subsequent layers (110) of bio-film media (70) and or at least one n subsequent layers of tires (112) as a Compact Density Zone (340).
Figure 7:
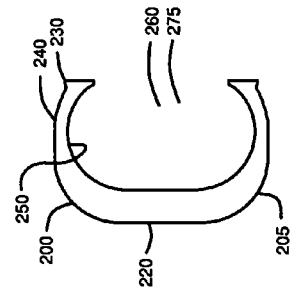
FIG. 7 illustrates a section view from FIG. 6 showing bio-film media (200) and or a tire (205) showing a torus outer perimeter (220), a torus inner perimeter (230), a torus outside (240), a torus inside (250), a torus inner perimeter opening (260), and a torus opening (275).
Figure 6:
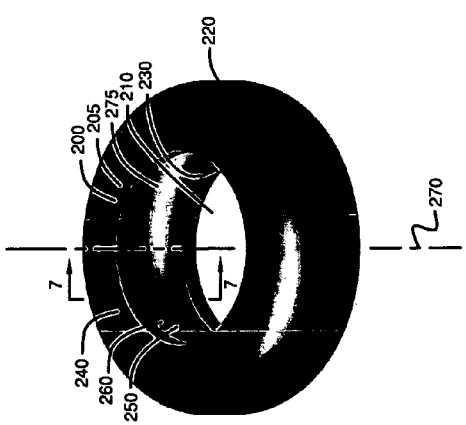
FIG. 6 shows a bio-film media (200) and or a tire (205) showing a torus center opening (210), a torus outer perimeter (220), a torus inner perimeter (230), a torus outside (240), a torus inside (250), a torus inner perimeter opening (260), a torus center axis (270), and a torus opening (275).
Figure 5:
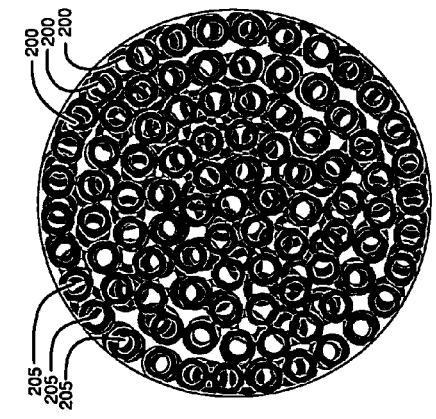
FIG. 5 illustrates at least one first layer of bio-film media (70) and or at least one first layers of tires (72) as a Loose Density Zone (300) covered by at least one second layer of bio-film media (90) and or at least one second layers of tires (92) as a Transition Density Zone (320) covered by at least one n subsequent layers (110) of bio-film media (70) and or at least one n subsequent layers of tires (112) as a Compact Density Zone (340).

FIG. 1 illustrates the organic and animal waste treatment apparatus (1). Seen is a container (10), configured in the preferred embodiment as a lagoon and formed as a closed earthen basin receiving organic and animal waste (120); the container (10) having a substantially horizontal level bottom (20) and having a top (30), the top (30) covered by a substantially horizontal top cover (40), which, in the preferred embodiment is composed of a flexible sheeting material primarily formed of plastics. the bottom (30) having a bottom surface (50) and the bottom surface (50) has a bottom surface area (60).

Positioned within the container (10) is at least one first layer of bio-film media (70) positioned substantially horizontally at the bottom surface (50). The at least one first layer (70) having a first layer top (80). At least one second layer of bio-film media (90) is positioned substantially horizontally on top of the first layer top (80). The at least one second layer of bio-film media (90) having a second layer top (100) and at least "n" subsequent layers (110) of substantially horizontally positioned bio-film media (200) placed on top of the second layer top (100).

Organic and animal waste (120) is introduced at the bottom (20) or at the top (30) by pipe means and pump means (130). Gases (140) emitted from the organic and animal waste (120) is contained by the top cover (40) and is conveyed by gas conveyance means (150), comprised in the preferred embodiment of pipe and pumps, to a storage or combustion means (160), composed in the preferred embodiment of compressors and storage tanks or into combustion engines used for production of electricity or for heating. Gases (140) are extracted from at least one top cover vent (170) composed of valve and pipe means.

The bio-film media (200) is substantially torus-shaped having a torus center opening (210), a torus outer perimeter (220) and a torus inner perimeter (230). The bio-film media (200) torus is hollow having a torus outside (240) and a torus inside (250). The bio-film media (200) torus at the torus inner perimeter (230), proximal a torus center axis vertical (270) is open forming a torus opening (275). A radial cross-section of the bio-film media (200) substantially forms a "U" shape. In the preferred embodiment, the bio-film media (200) is a vehicle tire (205). Where the bio-film media (200) is a tire, each tire has a tire center axis vertical (270).

The at least one first layer of bio-film media (70) forms a Loose Density Zone (300) where the at least one first layer of bio-film media (70) covers between 20% to 40% of the surface area upon which it is positioned whether the bottom surface (60), the top of a second layer top (100) or on top of a "n" subsequent layer top (115). The first layer top (80) has a first layer top surface area (85). The at least one second layer of bio-film media (90) forms a Transition Density Zone (320) where the at least one second layer of bio-film media (90) covers between 30% to 50% of the surface area upon which it is positioned whether the first layer top surface area (85) or on top of a "n" subsequent layer top (115). The second layer top (100) has a second layer top surface area (105). The at least "n" subsequent layers (110) forms a Compact Density Zone (340) where the at least n subsequent layers of bio-film media (110) covers between 40% to 70% of the surface area upon which it is positioned including the second layer top surface area (105). In the preferred embodiment the Compact Density Zone (340) is proximal the top (30); in alternative embodiments a Loose Density Zone (300) or a Transition Density Zone (320) may be proximal the top. Where bio-film media (200) is comprised of tires (205), said tires (205) in each layer is positioned substantially horizontally such that the tire center axis vertical of each tire is directed upwardly.

The at least one first layer of bio-film media (70) comprising the Loose Density Zone (300) is composed of at least "n" layers of bio-film media (200). The at least one second layer of bio-film media (90), comprising the Transition Density Zone (320) is composed of at least "n" layers of bio-film media (200). The at least "n" subsequent layers (110), comprising the Compact Density Zone (340), is composed of at least "n" layers of bio-film media (200).

When the Loose Density Zone (300) is composed of at least "n" layers of bio-film media (200) and Transition Density Zone (320) is composed of at least "n" layers of bio-film media (200) and the Compact Density Zone (340) is composed of at least "n" layers of bio-film media (200), each layer of the at least "n" layers of bio-film media (200) comprising the Loose Density Zone (300) may alternate with each layer of the at least "n" layers of bio-film media (200) comprising the Transition Density Zone (320) and or each layer of the at least "n" layers of bio-film media (200) comprising the Compact Density Zone (340) provided that a Compact Density Zone (340) is not positioned on top of a first layer top (80). The relative layering of each layer of bio-film media (200) of the Loose Density Zone (300), subsequent to the layer at the bottom (20), will be positioned substantially horizontally on top of the second layer top (100) next occurring distal to the bottom (20) or on top of the "n" subsequent layer top (114) next occurring distal to the bottom (20) and such that each layer of bio-film media of the Transition Density Zone, subsequent to the layer most proximal the bottom, will be positioned substantially horizontally on top of the first layer top next occurring distal to the bottom or the on top of the "n" subsequent layer top next occurring distal to the bottom.

The Loose Density Zone (300), in the preferred embodiment, extends upwardly from the bottom (20) having a Loose Density Zone height H1 (305) of between 1 and 20 feet. The Transition Density Zone (320), in the preferred embodiment, extends upwardly from the first layer top (80) having a Transition Density Zone height H2 (325) of between 1 and 10 feet. The Compact Density Zone (340), in the preferred embodiment, extends upwardly from the second layer top (100) having a Compact Density Zone height H3 (345) of between 1 and 20 feet.

The container (10) has a container center axis (12), a container inside (14) and a container inside surface (16). In the preferred embodiment the container (10) is an earthen basin. In alternative embodiments the container may be an earthen basin which is lined with substantially flexible membrane or plastic films or lined with substantially rigid materials such as concrete. The container may also be a tank formed of metals.

Within the container (10), in the preferred embodiment, there will be at least one baffle (400) extending horizontally, intermediate the bottom (20) and the top (30), from or proximal to the container inside surface (16) toward the container center axis (12). In an alternative embodiment there will be no baffle (400). The container center axis (12) is a vertical axis from the bottom (20) to the top (30) at approximately a center of the container (10). It is recognized that a container (10) formed from an earthen basin may be irregular in its shape and that determining a center may be problematic. The at least one baffle (400) is planar, having a baffle inner edge (420) proximal the container center axis (12) and a baffle width (440) from the container inside surface (16) to the baffle inner edge (420). The at least one planar baffle (400) circumnavigates all or part of the container (10) at the container inside surface (16). In the preferred embodiment the baffle width (440) is between 1 and 10 feet. In the preferred embodiment the at least one baffle (400) is composed of a semi rigid material including plastics and metals and including a high density polyethylene (HDPE) liner material.

In the preferred embodiment the container (10) has a sump (500) at the bottom (20) having a sump cover (520). The sump (500) receiving solids from organic and animal waste. Sump pump means (540) is pipe connected with pipe means (560) to circulate sump (500) contents from the sump (500) at or proximal the bottom (20) toward and proximal the top (30) or from or proximal the top (30) toward and to the sump (500) and the bottom (20). In the preferred embodiment a sump pump access tube (580) provides access to the sump pump means (540) from the ground surface (590). In the preferred embodiment the sump pump means (540) is a solids handling pump.

In the preferred embodiment the bio-film media (200) is a tire (205); an at least one first layer of bio-film media (70) is an at least one first layers of tires (72) and an at least one second layer of bio-film media (90) is an at least one second layer of tires (92); an at least one n subsequent layers (110) is an at least one n subsequent layers of tires (112).

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An organic and animal waste treatment apparatus comprising:
   a. a container receiving organic and animal waste; the container having a substantially horizontal level bottom and having a top, the top covered by a substantially horizontal top cover; the bottom having a bottom surface; the bottom surface having a bottom surface area;
   b. bio-film media composed of tires; each tire having a tire center opening; the tire center opening having a tire center axis vertical;
   c. at least one first layer of tires positioned substantially horizontally at the bottom surface such that the tire center axis vertical of each tire is directed upwardly; the at least one first layer having a first layer top; at least one second layer of tires positioned substantially horizontally on top of the first layer top such that the tire center axis vertical of each tire is directed upwardly; the at least one second layer of tires having a second layer top; at least "n" subsequent layers of substantially horizontally positioned tires placed on top of the second layer top such that the tire center axis vertical of each tire is directed upwardly; the at least "n" subsequent layer having a "n" subsequent layer top; each of the at least first layer of tires, at least one second layer of tires and the at least "n" subsequent layers are offset horizontally from contiguous layers of tires;
   d. organic and animal waste introduced at the bottom or at the top by pipe and pump means; gases emitted from the organic and animal waste is contained by the top cover and is conveyed by gas conveyance means to a storage or combustion means from at least one top cover vent.

2. An organic and animal waste treatment apparatus of claim 1 further comprising:
   a. the at least one first layer of tires comprising a Loose Density Zone where the at least one first layer of tires covers between 20% to 40% of the surface area upon which it is positioned including the bottom surface area; the first layer top having a first layer top surface area;
   b. the at least one second layer of tires comprising a Transition Density Zone where the at least one second layer of tires covers between 30% to 50% of the surface area upon which it is positioned including the first layer top surface area; the second layer top having a second layer top surface area;
   c. the at least n subsequent layers comprising a Compact Density Zone where the at least n subsequent layers of tires covers between 40% to 70% of the surface area upon which is is positioned including the second layer top surface area; the Compact Density Zone is proximal the top cover.

3. An organic and animal waste treatment apparatus of claim 2 further comprising:
   a. the at least one first layer of tires comprising the Loose Density Zone is composed of at least "n" layers of tires; and the at least one second layer of tires comprising the Transition Density Zone is composed of at least "n" layers of tires; and the at least "n" subsequent layers of tires, comprising the Compact Density Zone, is composed of at least "n" layers of tires;
   b. when the Loose Density Zone is composed of at least "n" layers of tires and Transition Density Zone is composed of at least "n" layers of tires and the Compact Density Zone is composed of at least "n" layers of tires, each layer of the at least "n" layers of tires comprising the Loose Density Zone may alternate with each layer of the at least "n" layers of tires comprising the Transition Density Zone and or each layer of the at least "n" layers of tires comprising the Compact Density Zone provided that a Compact Density Zone is not positioned on top of a first layer top; the relative layering of each layer of tires of the Loose Density Zone, subsequent to the layer at the bottom, will be positioned substantially horizontally on top of the second layer top next occurring distal to the bottom or on top of the "n" subsequent layer top next occurring distal to the bottom and such that each layer of tires of the Transition Density Zone, subsequent to the layer most proximal the bottom, will be positioned substantially horizontally on top of the first layer top next occurring distal to the bottom or the on top of the "n" subsequent layer top next occurring distal to the bottom.

4. an organic and animal waste treatment apparatus of claim 3 further comprising:
   a. the Loose Density Zone extends upwardly from the bottom having a height of between 1 and 20 feet;
   b. the Transition Density Zone extends upwardly from the first layer top having a height of between 1 and 10 feet;
   c. the Compact Density Zone extends upwardly from the second layer top having a height of between 1 end 20 feet.

5. an organic and animal waste treatment apparatus of claim 4 further comprising:
   a. the container has a container center axis and a container inside; the container inside has a container inside surface;
   b. at least one baffle extending horizontally, intermediate the bottom and the top, from or proximal to the container inside surface toward the container center axis.

6. An organic and animal waste treatment apparatus of claim 5 further comprising:
   a. the at least one baffle is planar, having a baffle inner edge proximal the container center axis and a baffle width from or proximal to the container inside surface to the baffle inner edge;
   b. the at least one baffle circumnavigates all or part of the container at the container inside surface.

7. An organic and animal waste treatment apparatus of claim 6 further comprising:
   a. the baffle width is between 1 and 10 feet.

8. An organic and animal waste treatment apparatus of claim 7 further comprising:
   a. the at least one baffle is composed of a semi rigid material;
   b. a sump at the bottom having a sump cover,
   c. pump means pipe connected with pipe means to circulate sump contents from the sump toward and proximal the top or from or proximal the top toward and to the sump.

9. An organic and animal waste treatment apparatus of claim 8 further comprising:
   a. the at least one baffle is composed of a high density polyethylene (HDPE) liner material;
   b. a pump access tube from the pump means to the ground surface;
   c. pump means is a solids handling pump.

10. An organic and animal waste treatment apparatus comprising:
   a. a container receiving organic and animal waste; the container having a substantially horizontal level bottom and having a top, the top covered by a substantially horizontal top cover; the bottom having a bottom surface; the bottom surface having a bottom surface area;
   b. a plurality of layers of biofilm media composed of tires, at least one first layer of bio-film media, positioned substantially horizontally at the bottom surface; the at least one first layer having a first layer top; at least one second layer of bio-film media positioned substantially horizontally on top of the first layer top; the at least one second layer of bio-film media having a second layer top; at least n subsequent layers of substantially horizontally positioned bio-film media placed on top of the second layer top; each of the at least first layer of tires, at least one second layer of tires and the at least "n" subsequent layers are offset horizontally from contiguous layers of tires:
   c. organic and animal waste introduced at the bottom or at the top by pipe and pump means; gases emitted from the organic and animal waste is contained by the top cover and is conveyed by gas conveyance means to a storage or combustion means from at least one top cover vent.

11. An organic and animal waste treatment apparatus of claim 10 further comprising:
   a. the bio-film media is substantially torus-shaped having a torus center opening, the torus center opening having a torus center axis verticle, a torus outer perimeter, a torus inner perimeter; the torus is hollow having a torus outside and a torus inside; the torus at the torus inner perimeter proximal the torus center axis is open; a radial cross-section of the bio-film media substantially forms yields a "U" shape;
   b. the at least one first layer of bio-film media comprising a Loose Density Zone where the at least one first layer of bio-film media covers between 20% to 40% of the surface area upon which it is positioned including the bottom surface area such that the torus center axis vertical of each bio-film media is directed upwardly; the first layer top having a first layer top surface area;
   c. the at least one second layer of bio-film media comprising a Transition Density Zone where the at least one second layer of bio-film media covers between 30% to 50% of the surface area upon which it is positioned including the first layer top surface area, is positioned such that the torus center axis vertical of each bio-film media is directed upwardly; the second layer top having a second layer top surface area;
   d. the at least n subsequent layers comprising a Compact Density Zone where the at least n subsequent layers of bio-film media covers between 40% to 70% of the surface area upon which it is positioned including the second layer top surface area, is positioned such that the torus center axis vertical of each bio-film media is directed upwardly; the Compact Density Zone is proximal the top cover.

12. An organic and animal waste treatment apparatus of claim 11 further comprising:
   a. the at least one first layer of bio-film media comprising the Loose Density Zone is composed of at least "n" layers of bio-film media; and the at least one second layer of bio-film media comprising the Transition Density Zone is composed of at least "n" layers of bio-film media;
   b. when the Loose Density Zone is composed of at least "n" layers of bio-film media and Transition Density Zone is composed of at least "n" layers of bio-film media and the Compact Density Zone is composed of at least "n" layers of bio-film media, each layer of the at least "n" layers of bio-film media comprising the Loose Density Zone may alternate with each layer of the at least "n" layers of bio-film media comprising the Transition Density Zone and or each layer of the at least "n" layers of bio-film media comprising the Compact Density Zone provided that a Compact Density Zone is not positioned on top of a first layer top; the relative layering of each layer of bio-film media of the Loose Density Zone, subsequent to the layer at the bottom, will be positioned substantially horizontally on top of the second layer top next occurring distal to the bottom or on top of the "n" subsequent layer top next occurring distal to the bottom and such that each layer of bio-film media of the Transition Density Zone, subsequent to the layer most proximal the bottom, will be positioned substantially horizontally on top of the first layer top next occurring distal to the bottom or the on top of the "n" subsequent layer top next occurring distal to the bottom.

13. an organic and animal waste treatment apparatus of claim 12 further comprising:
   a. the Loose Density Zone extends upwardly from the bottom having a height of between 1 and 20 feet;
   b. the Transition Density Zone extends upwardly from the first layer top having a height of between 1 and 10 feet;
   c. the Compact Density Zone extends upwardly from the second layer top having a height of between 1 and 20 feet.

14. an organic and animal waste treatment apparatus of claim 13 further comprising:
   a. the container has a container center axis and a container inside; the container inside has a container inside surface;
   b. at least one baffle extending horizontally, intermediate the bottom and the top, from or proximal to the container inside surface toward the container center axis.

15. An organic and animal waste treatment apparatus of claim 14 further comprising:
   a. the at least one baffle is planar, having a baffle inner edge proximal the container center axis and a baffle width from the container inside surface to the baffle inner edge;
   b. the at least one baffle circumnavigates all or part of the container at the container inside surface.

16. An organic and animal waste treatment apparatus of claim 15 further comprising:
   a. the baffle width is between 1 and 10 feet.

17. An organic and animal waste treatment apparatus of claim 16 further comprising:
   a. the at least one baffle is composed of a semi rigid material;
   b. a sump at the bottom having a sump cover;
   c. pump means pipe connected with pipe means to circulate sump contents from the sump toward and proximal the top or from or proximal the top toward and to the sump.

18. An organic and animal waste treatment apparatus of claim 17 further comprising:
   a. the at least one baffle is composed of a high density polyethylene (HDPE) liner material;
   b. a pump access tube from the pump means to the ground surface;
   c. pump means is a solids handling pump.

* * * * *